No. 628,466. Patented July 11, 1899.
A. HOUGHTLIN.
CUTTING STICK AND RETAINING DEVICE THEREFOR.
(Application filed June 9, 1898.)
(No Model.)
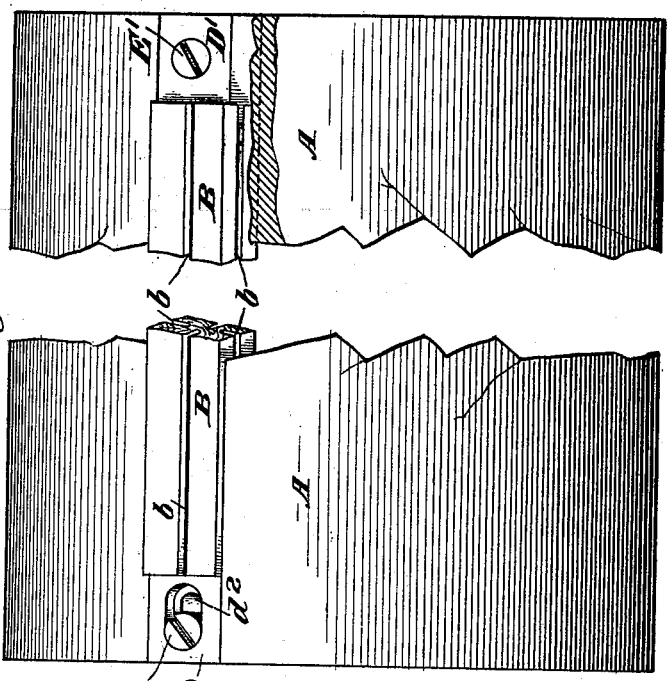
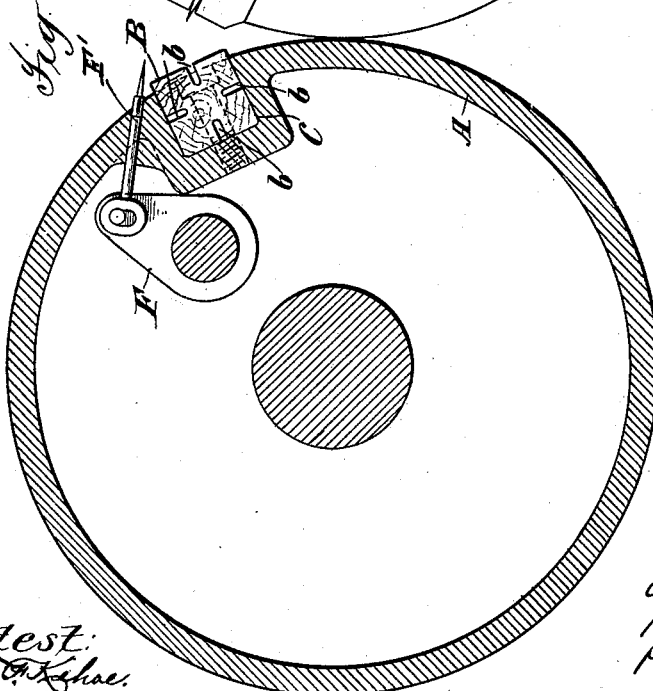
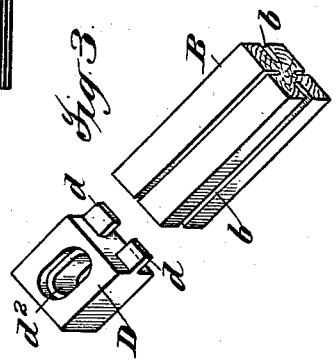
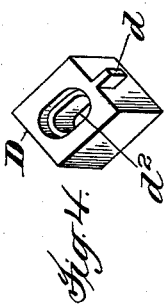
Attest:
Inventor:
Alfred Houghtlin
By Philipp Phelps Sanger
Attys

United States Patent Office.

ALFRED HOUGHTLIN, OF NEW YORK, N. Y., ASSIGNOR TO ROBERT HOE, THEODORE H. MEAD, AND CHARLES W. CARPENTER, OF SAME PLACE.

CUTTING-STICK AND RETAINING DEVICE THEREFOR.

SPECIFICATION forming part of Letters Patent No. 628,466, dated July 11, 1899.

Application filed June 9, 1898. Serial No. 682,996. (No model.)

*To all whom it may concern:*

Be it known that I, ALFRED HOUGHTLIN, a citizen of the United States, residing at New York city, county of Kings, and State of New York, have invented certain new and useful Improvements in Cutting-Sticks and Retaining Devices Therefor, fully described and represented in the following specification and the accompanying drawings, forming a part of the same.

This invention relates to an improvement in cutting-sticks for paper-cutters and retaining devices therefor.

In those types of paper-cutting machines in which the cutting-knife coöperates with a cutting-bed it is customary to employ a stick, ordinarily termed a "cutting-stick," suitably located in the bed, against which the blade of the knife strikes after passing through the material to be cut. Any considerable use of the cutting-machine, however, causes the stick to wear and destroys its serviceability. In view of this fact the cutting-sticks have been made reversible—that is, they have been made polygonal in shape and so mounted in the cutting-bed that they could be removed after one side became worn and a fresh side presented to the cutter—by which arrangement the life of the stick is very considerably lengthened. In such constructions the stick has, however, been held in position by friction, or springs, or clamps, or other similar devices acting on the side of the stick. Sticks so held cannot be readily removed for reversing and when used with reciprocating cutters making a shear cut the knife has a tendency to push the stick endwise out of the bed. Constructions have been devised to prevent this endwise movement; but the devices used for this purpose do not hold the stick against movement vertically as well as horizontally.

The improvement which forms the subject of this application has for its object to produce a reversible cutting-stick which shall be securely and firmly held at its ends and which can be readily and quickly removed, reversed, and replaced.

With this object in view the invention consists in certain constructions, parts, improvements, and constructions, which will be hereinafter described, and pointed out in the claims hereunto appended.

In the accompanying drawings, which constitute a part of this application, Figure 1 is a view of a rotary cutting-bed, showing a cutting-stick embodying the invention mounted therein. Fig. 2 is a vertical central section of one of the cutting-rolls ordinarily employed in a printing-machine with the improved cutting-stick mounted therein, the coöperating knife-carrying roll being also indicated in this figure. Fig. 3 is a perspective view of a portion of the stick and one of the retaining devices. Fig. 4 is a view of a modified form of one of the retaining devices.

In the drawings, A indicates a rotary cutting-bed, this bed, as herein shown, forming one of the cutting-rolls of a printing-machine. It is to be understood, however, that the improvement, which is hereinafter to be described, is not confined to its use to cutting-rolls or to rotary cutters of any form, but that it can be applied to any form of cutting-machine wherein a knife coöperates with a cutting-bed. It is well adapted, for instance, for use with the ordinary reciprocating paper-cutting machine, in which a reciprocating knife coöperates with a flat bed.

Suitably mounted in the cutting-bed A is a polygonal cutting-stick B. This stick is herein shown as square in cross-section, but may of course have as many sides as is desired. In each of its operative faces is formed a groove *b*, into which groove the cutting-knife C enters upon the completion of the cut.

The cutting-stick B is preferably located in a recess *c* in the cutting-bed and is held therein by devices acting upon its ends. Such devices preferably consist of a pair of blocks D D'. These blocks D D' are preferably, though not necessarily, located in the recess *c* before referred to and are or may be provided with one or more projections *d d*, which engage the grooves *b* in the cutting-stick. In the preferred form of the construction each block D D' is provided with a pair of projections *d*, which projections enter the grooves upon the sides of the stick. It is obvious, however, that the blocks D D' might be provided with a single projection which would coöperate with the groove in the top of the stick, such a construction being indicated in Fig. 4. Other forms of retaining devices acting on the ends of the stick may be used instead of the blocks, provided they act to reliably hold and retain the stick from vertical as well as horizontal movement.

The block D' is preferably detachably secured to the cutting-bed by means of a suitable screw E', which passes through a hole therein, though it may be secured in any other convenient way. The block D in the preferred form of the invention is preferably provided with an elongated slot $d^2$, through which slot passes the screw E, by which the block is secured to the bed. This construction, it will be seen, enables the cutting-stick to be readily removed and turned over, so as to present a fresh face to the cutting-knife. By loosening the screw E the block D can be drawn back so as to disengage its projection $d$ from the grooves in the stick, and the stick can then be quickly removed, reversed, and replaced. While the slot $d^2$, in connection with the screw, forms a ready and convenient means for detachably securing the block D to the bed, it is obvious that it might be dispensed with and the block detachably secured to the bed in any other convenient way.

F F' represent the usual retaining-pins which are ordinarily used with cutting-rolls of the type herein illustrated.

It is obvious that the retaining devices herein illustrated and described form a ready and convenient means for attaching cutting-sticks to their beds and that they may be used with cutting-sticks which are not reversible. It is also obvious that when the retaining devices consist of blocks, such as described, only one of them need be made detachable from the bed, the other being permanently attached to the bed. So, too, only one retaining-block need be used, as the coöperating device might consist of holding projections extending from the side walls of the recess $c$, or in case the recess is formed with a closed end these holding projections might extend therefrom, or a properly-constructed retaining device might be used at one end of the stick alone, the other end being inserted in a suitable recess or socket formed in the cutting-bed. From these considerations it is apparent that the invention is not limited to the precise constructions shown and described, but that various modifications thereof may be made without departing from the spirit and scope of the invention.

What I claim is—

1. The combination with a bed having a recess, of a polygonal cutting-stick mounted therein, and means mounted on the bed and acting at the ends of the stick to hold it in position, the means at one end of the stick being movable endwise to release the stick, substantially as described.

2. The combination with a bed, of a polygonal cutting-stick mounted thereon and having grooves in its sides to receive the knife, and devices mounted on the bed and acting at the ends of the stick to hold it in position, the devices at one end of the stick being movable to release the stick, substantially as described.

3. The combination with a bed, of a cutting-stick provided with a groove to receive a knife, and suitable retaining devices, one of said devices having a projection engaging the groove, substantially as described.

4. The combination with a bed, of a cutting-stick provided with a groove to receive a knife, and suitable retaining devices, one of said devices being removably mounted on the bed and having a projection engaging said groove, substantially as described.

5. The combination with a bed, of a polygonal cutting-stick having grooves upon its sides to receive a knife, and suitable retaining devices, one of said devices having a projection engaging one of said grooves, substantially as described.

6. The combination with a bed, of a polygonal cutting-stick provided with grooves upon its sides to receive a knife, and suitable retaining devices, one of said devices being adjustably mounted on the bed and having a projection engaging one of said grooves, substantially as described.

7. The combination with a bed, of a polygonal cutting-stick provided with grooves to receive a knife, of means for holding the stick at one end, and a slotted block holding it at the other end, substantially as described.

8. The combination with a bed, of a polygonal cutting-stick provided with grooves upon its sides to receive a knife, a retaining device located at one end of the stick, and a slotted block located at the other end of the stick and having a projection engaging a groove in the stick, substantially as described.

9. The combination with a bed, of a polygonal cutting-stick provided with grooves upon its sides to receive a knife, a stationary block located at one end of the stick and having a projection engaging one of the grooves in the stick, and a slotted block located at the other end of the stick and also having a projection engaging a groove in the stick, substantially as described.

10. The combination with a bed, of a polygonal cutting-stick provided with grooves upon its sides, a block located at one end of the stick and having a plurality of projections engaging grooves upon sides of the stick, and a slotted block located at the other end of the stick and having a plurality of projections for engaging grooves in the stick, substantially as described.

11. The combination with a rotary cutting-bed having a depression therein to receive a cutting-stick, of a polygonal cutting-stick located in the depression and having grooves upon its sides, retaining means at one end of the stick, and a suitable retaining-block also located in the depression and having a projection which engages a groove in the stick, substantially as described.

12. The combination with a rotary cutting-bed having a depression therein to receive a cutting-stick, of a polygonal cutting-stick having grooves upon its sides, a retaining-block located in the depression at one end of the stick and having projections therein engaging grooves in the stick, and a slotted retaining-block located in the depression at the other end of the stick and also having projections to engage said grooves, substantially as described.

In testimony whereof I have hereunto set my hand in the presence of two subscribing witnesses.

ALFRED HOUGHTLIN.

Witnesses:
F. W. H. CRANE,
E. L. SPEIR.